United States Patent [19]
Silberman et al.

[11] Patent Number: 6,003,119
[45] Date of Patent: Dec. 14, 1999

[54] MEMORY CIRCUIT FOR REORDERING SELECTED DATA IN PARALLEL WITH SELECTION OF THE DATA FROM THE MEMORY CIRCUIT

[75] Inventors: Joel Abraham Silberman; Sang Hoo Dhong, both of Austin, Tex.

[73] Assignee: International Business Machines Corporation, Armonk, N.Y.

[21] Appl. No.: 08/853,594

[22] Filed: May 9, 1997

[51] Int. Cl.$^6$ ............................................. G06F 12/00
[52] U.S. Cl. ........................... 711/168; 711/150; 711/118; 711/201
[58] Field of Search ................... 711/168, 150, 711/118, 201; 395/391, 800.23; 712/23, 215

[56] References Cited

U.S. PATENT DOCUMENTS

| | | | |
|---|---|---|---|
| 5,353,426 | 10/1994 | Patel et al. ............................ | 711/118 |
| 5,581,719 | 12/1996 | Steely, Jr. et al. ..................... | 395/383 |
| 5,592,634 | 1/1997 | Circello et al. ........................ | 395/586 |
| 5,608,886 | 3/1997 | Blomgren et al. ..................... | 395/586 |
| 5,802,602 | 9/1998 | Rahman et al. ....................... | 711/204 |
| 5,809,272 | 9/1998 | Thusoo et al. ......................... | 395/386 |

*Primary Examiner*—Eddie P. Chan
*Assistant Examiner*—Hong Kim
*Attorney, Agent, or Firm*—Kelly K. Kordzik; Winstead Sechrest & Minick P.C.; Volel Emile

[57] ABSTRACT

A cache memory comprising a plurality of memory locations and a multiplexer tree for accessing selected memory locations and reordering the data retrieved from the selected memory locations prior to outputting the data to the processor. The multiplexer tree is controlled by an adder/decoder circuit which generates an effective address from two address operands and causes the multiplexer tree to perform the steps of accessing the data and re-ordering the data at least partially in parallel, thereby reducing memory latency.

16 Claims, 8 Drawing Sheets

MEMORY CIRCUIT FOR REORDERING SELECTED DATA IN PARALLEL WITH SELECTION OF THE DATA FROM THE MEMORY CIRCUIT

TECHNICAL FIELD

The present invention relates in general to electronic circuits and systems and, in particular, to a low-latency cache and circuits and systems incorporating same.

BACKGROUND INFORMATION

In modern microprocessor systems, processor cycle time continues to decrease as technology continues to improve. Design improvements, such as speculative execution, deeper pipelines, and more execution elements, increase the performance of processing systems and put a heavier burden on the memory interface, since the processor demands data and instructions more rapidly from memory. In order to keep pace with the heightened speed of the processing systems, cache memories are often implemented in microprocessors.

The basic operation of cache memories is well-known. When a processor ("CPU") needs to access memory, the cache is examined. If the word addressed by the CPU is found in the cache, it is read from the "fast" cache memory. If the word addressed by the CPU is not found in the cache, the main memory is accessed to read the word. A block of words containing the one just accessed is then transferred from main memory to cache memory. In this manner, some data is transferred to cache so that future references to memory find the required words in the fast cache memory.

Processing systems employing cache memories are well known in the art. Cache memories are very high-speed devices that increase the speed of a data processing system by making current programs and data available to a CPU with a minimal amount of latency delay. Large on-chip caches (L1 caches) are implemented to reduce memory latency and often are augmented by larger off-chip caches (L2 caches). Although cache memory is only a small fraction of the size of main memory, a large fraction of memory requests are successfully found in the fast cache memory because of the "locality of reference" property of programs. This property holds that memory references during any given time interval tend to be confined to a few localized areas of memory. Cache memories improve system performance by keeping the most frequently accessed instructions and data in the fast cache memory, thereby allowing the average memory access time of the overall processing system to approach the access time of the cache.

It has therefore become important to reduce the amount of latency in each cache access in order to meet the memory access demands resulting from the decrease in machine cycle times and from the large volume of instructions issued by superscalar machines. A cache access normally involves the generation of an address by adding two numbers, decoding this address to select a particular row of locations in the cache, reading those locations and selecting the desired part of the row, and, often, reordering the data read from the cache to a suitable format. These steps are generally performed in a sequential manner. First, the addition of the address operands is normally completed before the sum is presented to the decoder. Next, full decoding of the row selection portion of the address must be done to select one of the memory wordlines. Finally, the required bytes within the cache line are selected and possibly reordered only after data from the chosen row are impressed on the bitlines. Thus, the latency for a load operation is the sum of delays for addition, decoding, cache array access, byte selection, and byte reordering.

There is therefore a need for cache memories capable of performing at least some of the steps involved in a cache access in parallel with one other steps in order to reduce cache latency.

In particular, there is a need for cache memories capable of re-ordering bytes in parallel with the decoding and access of the data bytes being read from the cache.

SUMMARY OF THE INVENTION

According to one embodiment of the present invention, a memory circuit is provided comprising a plurality of memory locations for storing data and a first plurality of multiplexers coupled to the plurality of memory locations for selecting first selected ones of the data and outputting the first selected data on a first plurality of outputs of the first plurality of multiplexers. The memory circuit further comprises a second plurality of multiplexers coupled to the first plurality of outputs of the first plurality of multiplexers for selecting ones of the first plurality of outputs, receiving from the selected ones of the first plurality of outputs second selected ones of the first selected data, and outputting the second selected data on a data bus coupled to the memory circuit. The memory circuit also comprises control means for controlling the first plurality of multiplexers and the second plurality of multiplexers, wherein the control means causes the second plurality of multiplexers to select the selected ones of the first plurality of outputs at least partially in parallel with the selection of the first selected ones of the data by the first plurality of multiplexers.

The principles of the present invention are further embodied in a processing system comprising a processor, a main memory coupled to the processor, and a cache memory associated with the processor. The cache memory of the processing system comprises a plurality of memory locations for storing data, a first plurality of multiplexers coupled to the plurality of memory locations for selecting first selected ones of the data and outputting the first selected data on a first plurality of outputs of the first plurality of multiplexers, and a second plurality of multiplexers coupled to the first plurality of outputs of the first plurality of multiplexers for selecting ones of the first plurality of outputs, receiving from the selected ones of the first plurality of outputs second selected ones of the first selected data, and outputting the second selected data on a data bus coupled to the cache memory. The cache memory also comprises control means for controlling the first plurality of multiplexers and the second plurality of multiplexers, wherein the control means causes the second plurality of multiplexers to select the selected ones of the first plurality of outputs at least partially in parallel with the selection of the first selected ones of the data by the first plurality of multiplexers.

The principles of the present invention are further embodied in a memory circuit comprising a plurality of memory locations for storing data, a multiplexer tree coupled to the plurality of memory locations for accessing first selected ones of the data and outputting second selected ones of the first selected data on a data bus coupled to the memory circuit, and control means for controlling the multiplexer tree, wherein the control means causes the multiplexer tree to select the second selected data at least partially in parallel with the selection of the first selected data.

The foregoing has outlined rather broadly the features and technical advantages of the present invention in order that the detailed description of the invention that follows may be better understood. Additional features and advantages of the low-latency cache design will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The principles of the present invention and their advantages are best understood by referring to the illustrated embodiments depicted in FIGS. 1–5C of the drawings, in which like numbers designate like parts.

Figure 1:
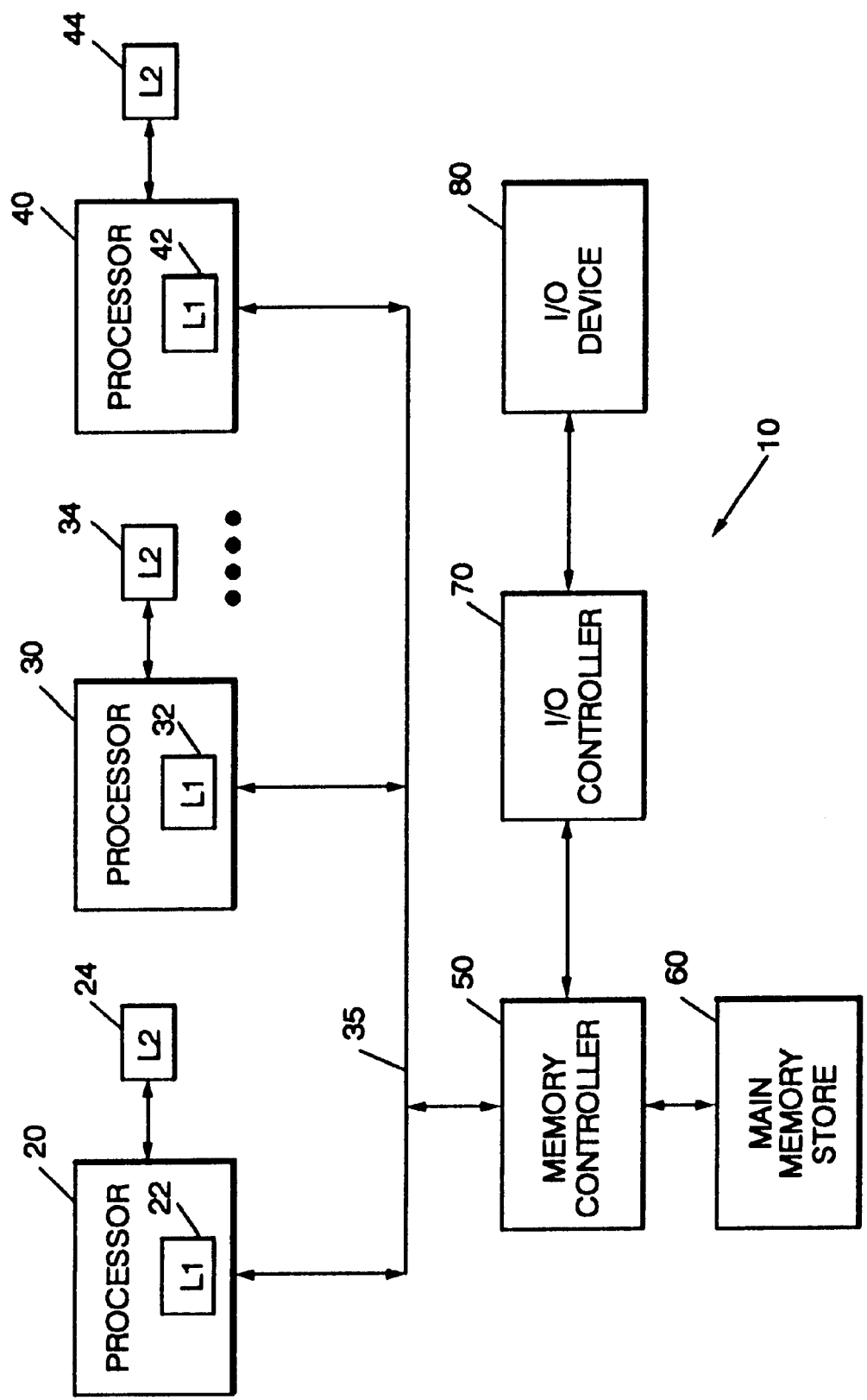
FIG. 1 is a block diagram of a multi-processor system incorporating low-latency caches in accordance with the present invention.

Referring now to FIG. 1, a processing system which advantageously embodies the present invention is depicted. Multi-processor system 10 includes a number of processing units 20, 30 and 40 operatively connected to system bus 35. Note that any number of processing units may be utilized within multi-processor system 10. Also connected to system bus 35 is memory controller 50, which controls access to main memory store 60. Memory controller 50 is also coupled to I/O controller 70, which is coupled to I/O device 80. Processing units 20, 30 and 40, I/O controller 70, and I/O device 80 may all be referred to as bus devices herein. As shown, each processor unit 20, 30 and 40 may include a processor and L1 caches 22, 32, and 42, respectively. The L1 (primary) caches may be located on the same chip as the respective processor. Coupled to processing units 20, 30 and 40 are L2 (secondary) caches 24, 34 and 44, respectively. Each L2 cache is connected to the system bus 35 via the processor to which it is attached.

Each L1 and L2 cache pair are normally serially related. The L1 caches may be implemented as store-in or write-through, while the larger and slower L2 cache is implemented as a write-back cache. Both the L1 and L2 cache controllers are physically implemented as part of the processing unit, and are connected via buses internal to the processing unit. Alternatively, the L1 cache controller could be off-chip.

Figure 2:
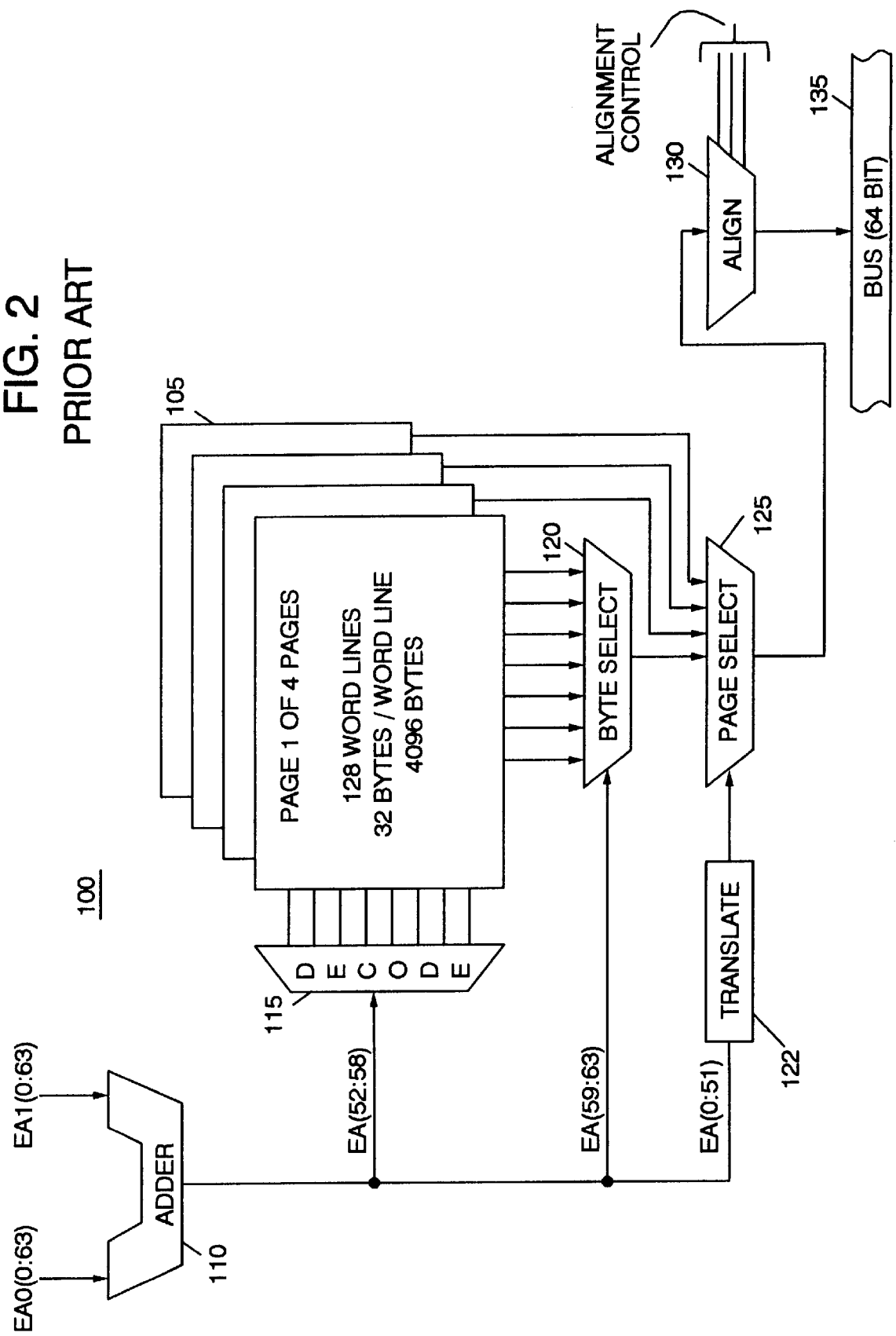
FIG. 2 is a block diagram of a cache in accordance with the prior art.

Referring next to FIG. 2, there is depicted a cache memory 100 in accordance with the prior art. Prior art cache memory 100 consists of 16,384 bytes of memory organized in four pages of 4,096 bytes each. Each page 105 is organized into 128 word lines consisting of 32 bytes of data each.

During a load or instruction fetch operation, two addresses, EA0(0:63) and EA1(0:63), are applied to the inputs of adder 110 in order to calculate EA (0:63), the effective address of the data bits to be fetched from cache memory 100. The twelve least significant bits of the effective address, EA(52:63), are applied to decoder 115 and byte selection circuit 120. Address bits EA(52:58) are used to decode and select one of the one hundred twenty-eight (128) word lines on each of four memory pages 105a–105d of cache memory 100. The thirty-two (32) bytes in the selected word line on each page 105 are applied to byte selection circuit 120 associated with each page 105. Address bits EA(59:63) are used to select up to eight (8) of the 32 bytes from each word line on each page 105.

Translation circuit 122 translates address bits EA(0:51) of the effective address to determine the correct page 105 on which the desired data bits are located. Translation circuit 122 controls page select circuit 125, which selects one of the four sets of selected bytes from the four pages in cache memory 100. The final set of between one and eight selected bytes are sent to alignment circuit 130. Finally, the bits of the signal ALIGNMENT CONTROL are used to re-order/shift the selected bytes using alignment circuit 130 according to the type of load or instruction fetch operation being performed. Alignment circuit 130 outputs the re-ordered bytes on bus 35. Thus, a 64-bit double word may be retrieved from cache memory 100 and part or all of the retrieved 64-bit double word may be re-ordered before being put onto bus 35. In some embodiments of the prior art, alignment (re-ordering) of bytes within a 64 bit word is usually performed by re-ordering the upper 4 bytes and the lower 4 bytes of the 64-bit word separately.

Figure 3:
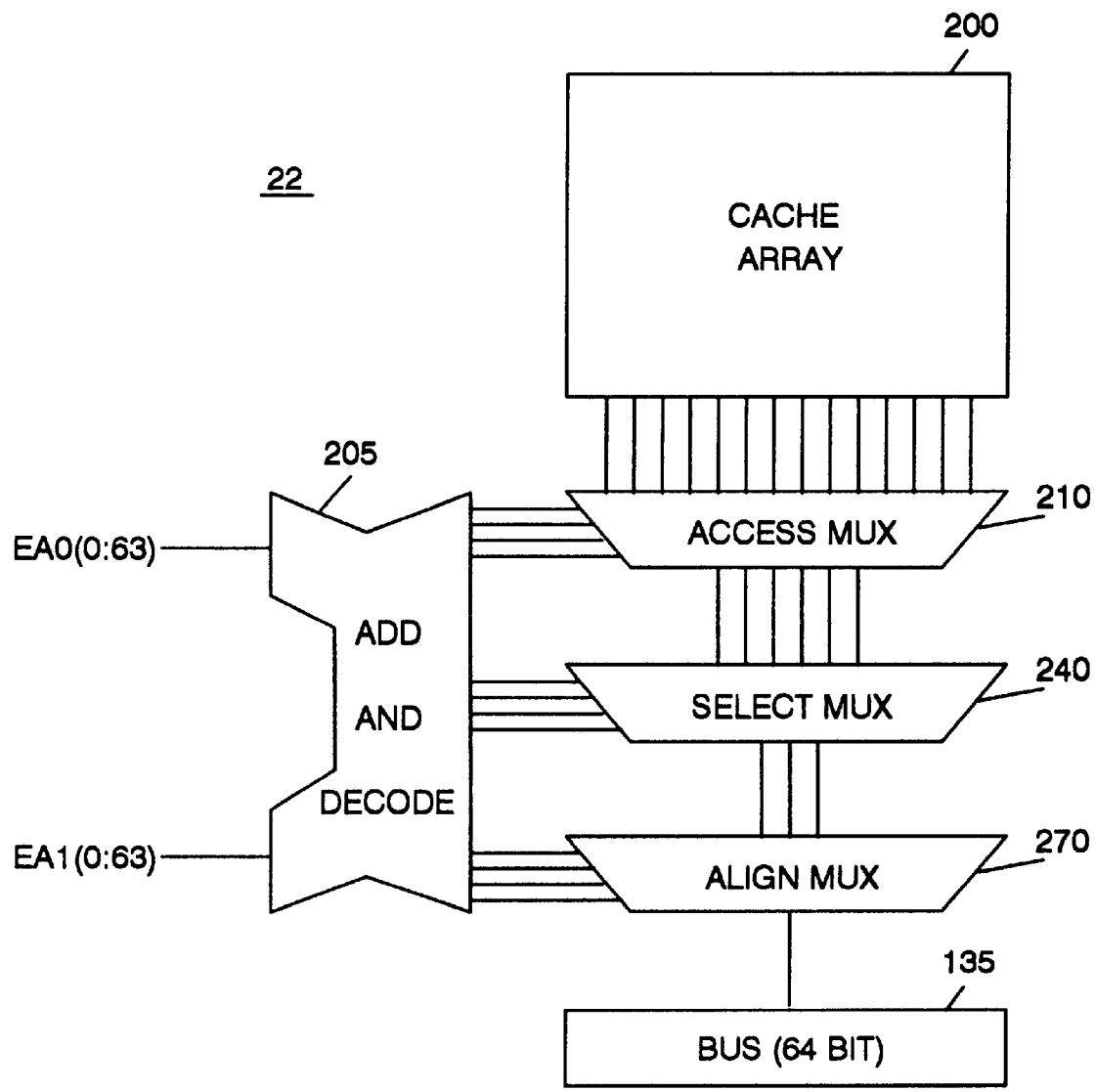
FIG. 3 is a block diagram of a low-latency cache in accordance with the present invention.

FIG. 3 is a block diagram of a low-latency cache 22 according to the present invention. The present invention permits the alignment (re-ordering) operations to be overlapped with the access and decoding operations. Data stored in cache array 200 is read using a multiplexer tree instead of the conventional arrangement of wordlines and bitlines. The arrangement of multiplexers is such as to select a row, to select the bytes of interest within the row, and to re-order the data at the same time as the data is steered to the output. Furthermore, as will be explained below in greater detail, because each multiplexer's inputs are selected using only a few bits of the address, only part of the addition involved in the effective address generation needs to be completed before access to cache array 200 is initiated. As a result, the remainder of the addition overlaps the access to cache array 200.

Cache memory 22 comprises an array of memory cells 200 coupled to access multiplexers 210. Access multiplexers 210 are used to access selected bytes from a row of memory cells in cache array 200. Selection multiplexers 240 are used to further select bytes and to begin to further select among rows as well as to steer the data toward the appropriate output position. Alignment multiplexers 270 are used to complete the re-ordering of the selected bytes prior to outputting the bytes on bus 35.

Access multiplexers 210, selection multiplexers 240 and alignment multiplexers 270 are controlled by add/decode circuit 205. Add/decode circuit 205 receives two effective address operands, EA0(0:63) and EA1(0:63) from the processor and generates a set of decoded control signals that are used to steer data through the access, selection, and alignment multiplexers. In one embodiment of the present invention, add/decode circuit 205 produces a decoded representation of digits of the sum directly, so that address generation and decoding are simultaneous. Thus, cache memory 22 allows significantly lower latency for load or instruction fetch operations because sequential operations are replaced by parallel ones.

Figures 4, 4A:
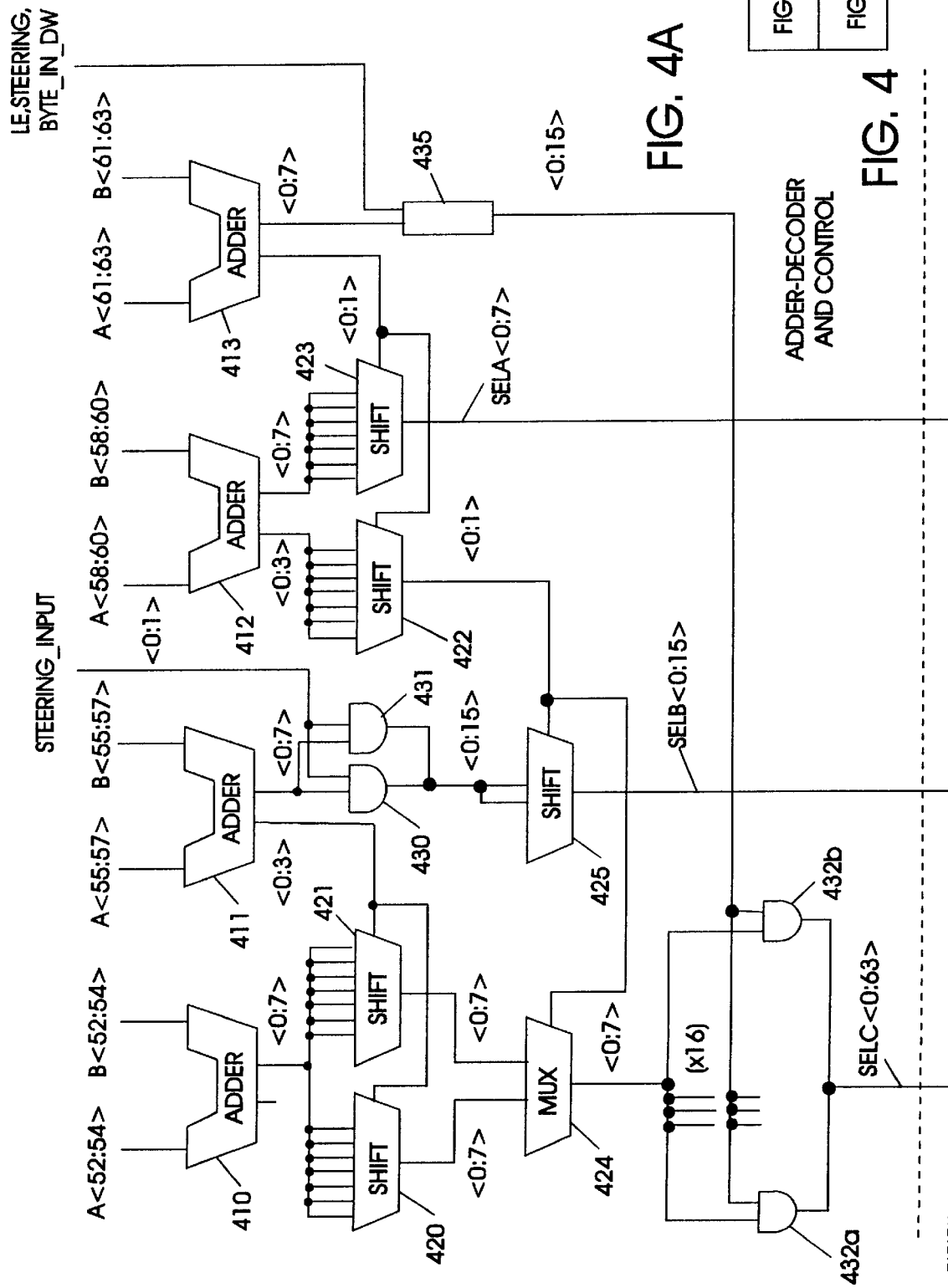
FIGS. 4, 4A, and 4B are a more detailed block diagram of the low-latency cache in FIG. 3.
Figure 4B:
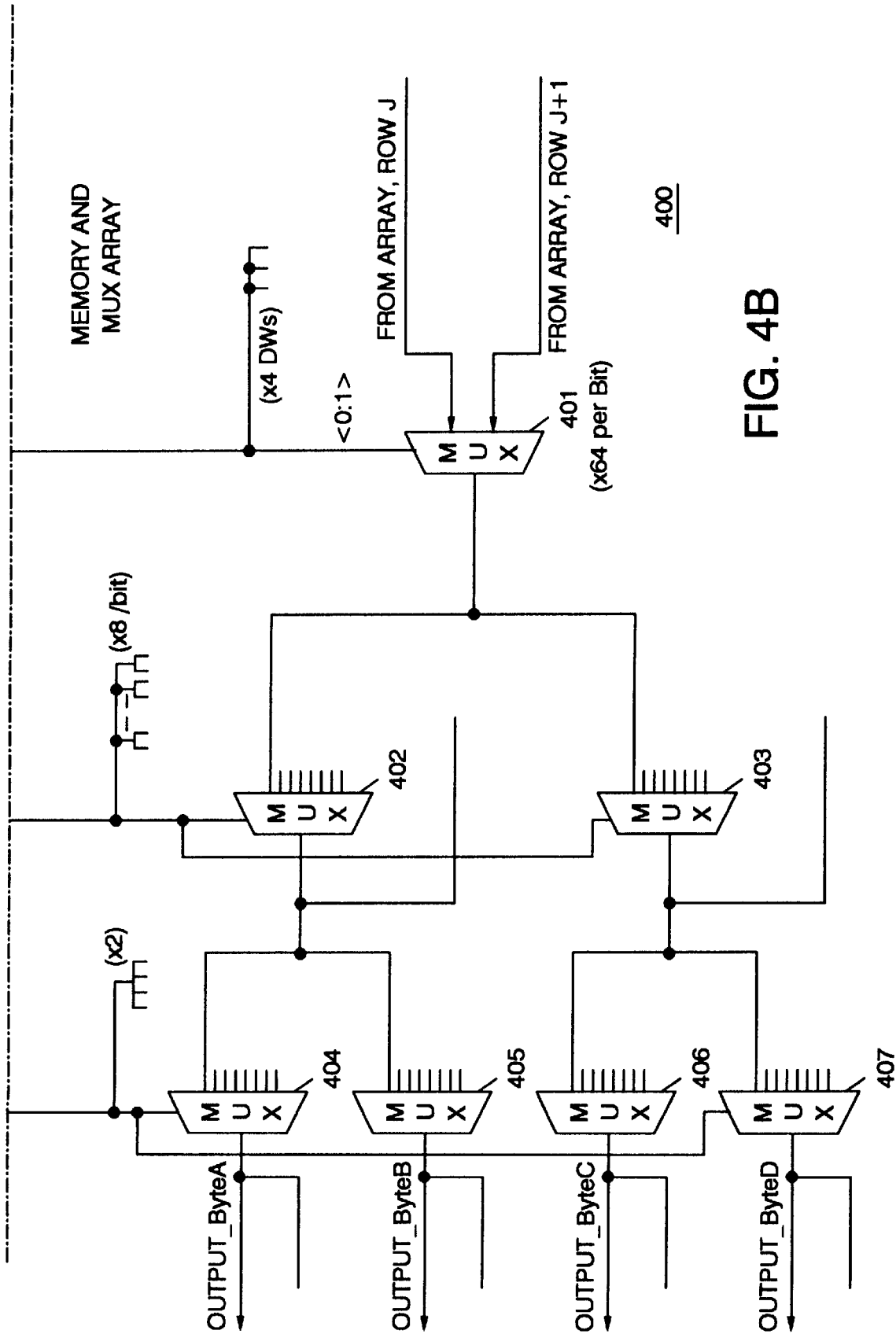

FIGS. 4A and 4B are a more detailed block diagram of multiplexer tree 400 and add/decode circuit 405 of low-latency cache 22. FIG. 4B depicts a simplified representation of selected elements of multiplexer tree 400, used to select and steer individual data bits from memory cells in cache array 200 to bus 35. Each of the multiplexers in a first tier of multiplexers, represented by multiplexer (MUX) 401, is connected to two corresponding bits in two rows in cache array 200, for example, Bit 0 of Doubleword 0 (DW0) in Row J and Bit 0 of Doubleword 0 (DW0) in Row J+1. Since each wordline (or row) of cache array 200 contains 256 bits organized into four 64-bit double words, DW0–DW3, sixty-four (64) multiplexers similar to MUX 401 are used to select between the 64 bits of DW0 of Row J and the 64 bits of DW0 of Row J+1. This multiplexer structure is then repeated for DW1, DW2 and DW3 of Row J and DW1, DW2 and DW3 of Row J+1, for a total of 256 multiplexers in the first tier. The one-of-eight select signal SELA(0:7) is used to select groups of 64 multiplexers in the first tier of multiplexers.

The bits selected by the first tier of multiplexers are further selected by a second tier of multiplexers represented by multiplexers (MUXes) 402 and 403. The output of each first tier multiplexer, such as MUX 401 is coupled to eight second tier multiplexers, such as MUXes 402 and 403. Each second tier multiplexer receives bits from eight different first tier multiplexers. The two-of-sixteen select signal SELB (0:15) is used to select the second tier multiplexers, such as MUXes 402 and 403.

The bytes selected by the second tier of multiplexers are further selected by a third tier of multiplexers represented by multiplexers (MUXes) 404–407, which perform the final selection and alignment of the bytes before outputting them onto bus 35. The select signal SELC(0:63) is used to select the third tier of multiplexers. The structure of multiplexer tree 400 in FIG. 4B is such that a byte in the lower four bytes of the selected doubleword may be steered into any one of four bytes in the lower half of bus 35. Similarly, bytes in the upper four bytes of the selected doubleword are steered into the upper half of bus 35.

The use of multiplexer tree 400 to select a given memory location and route the data to bus 35 permits overlapping various portions of the cache access operation. The size of the output data can vary from a single byte to an aligned doubleword (eight bytes). The bytes within each group of four can be re-ordered to any permutation. Other cache organizations, such as set associate, can be designed using the basic blocks of storage array, multiplexer tree, and controller/adder with some modification of the example shown. Although the example shown is a 4-Kbyte direct mapped cache organized as 128 lines of 32 bytes each, it should be apparent to those skilled in the art that the present invention may readily be implemented in cache memories of other sizes and configurations without departing from the spirit and scope of the invention as defined by the appended claims.

Figure 5A:
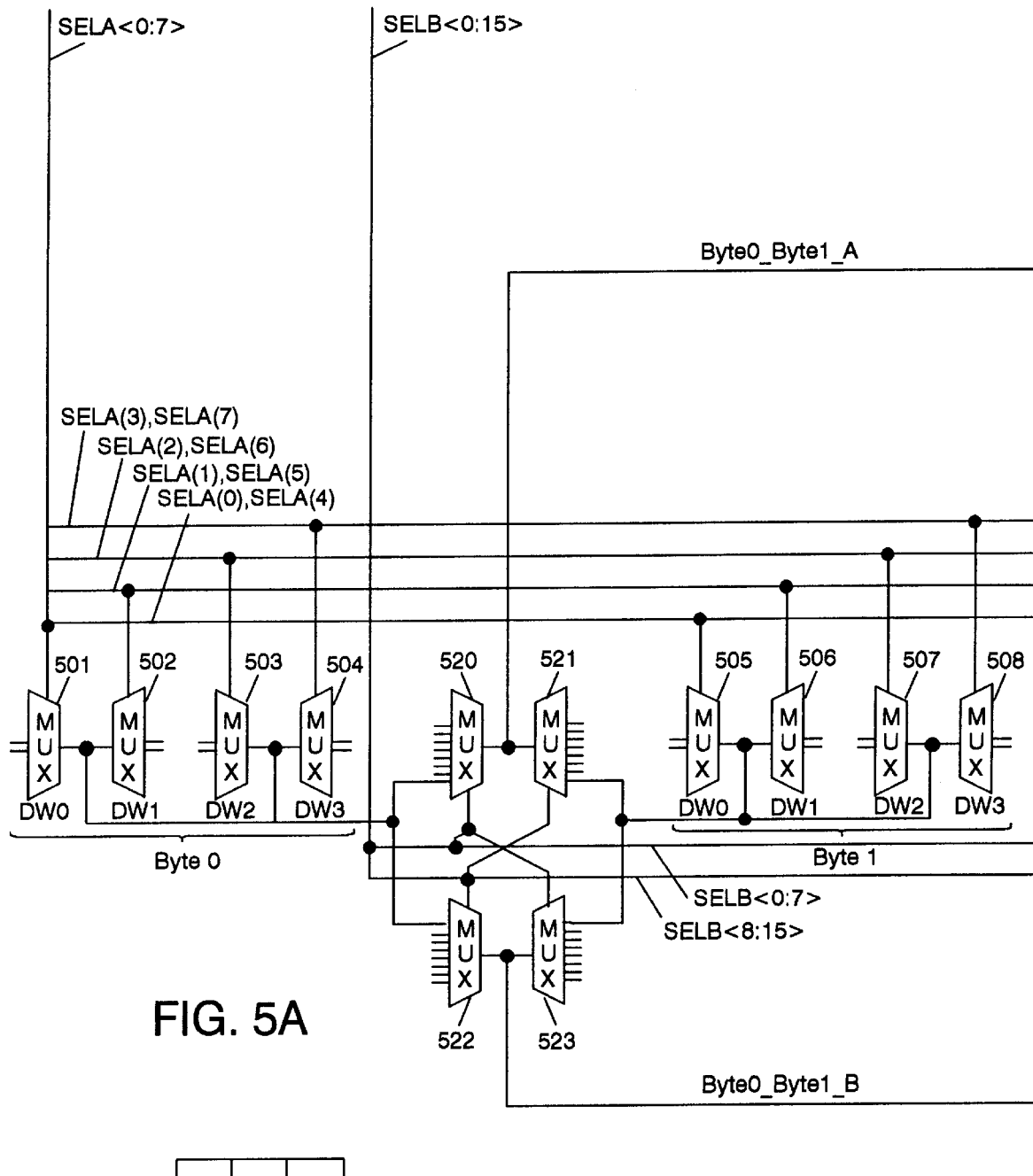
FIGS. 5 and 5A–5C are a more detailed block diagram of the multiplexer tree in FIG. 4.
Figure 5:
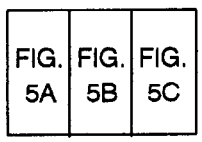
Figure 5B:
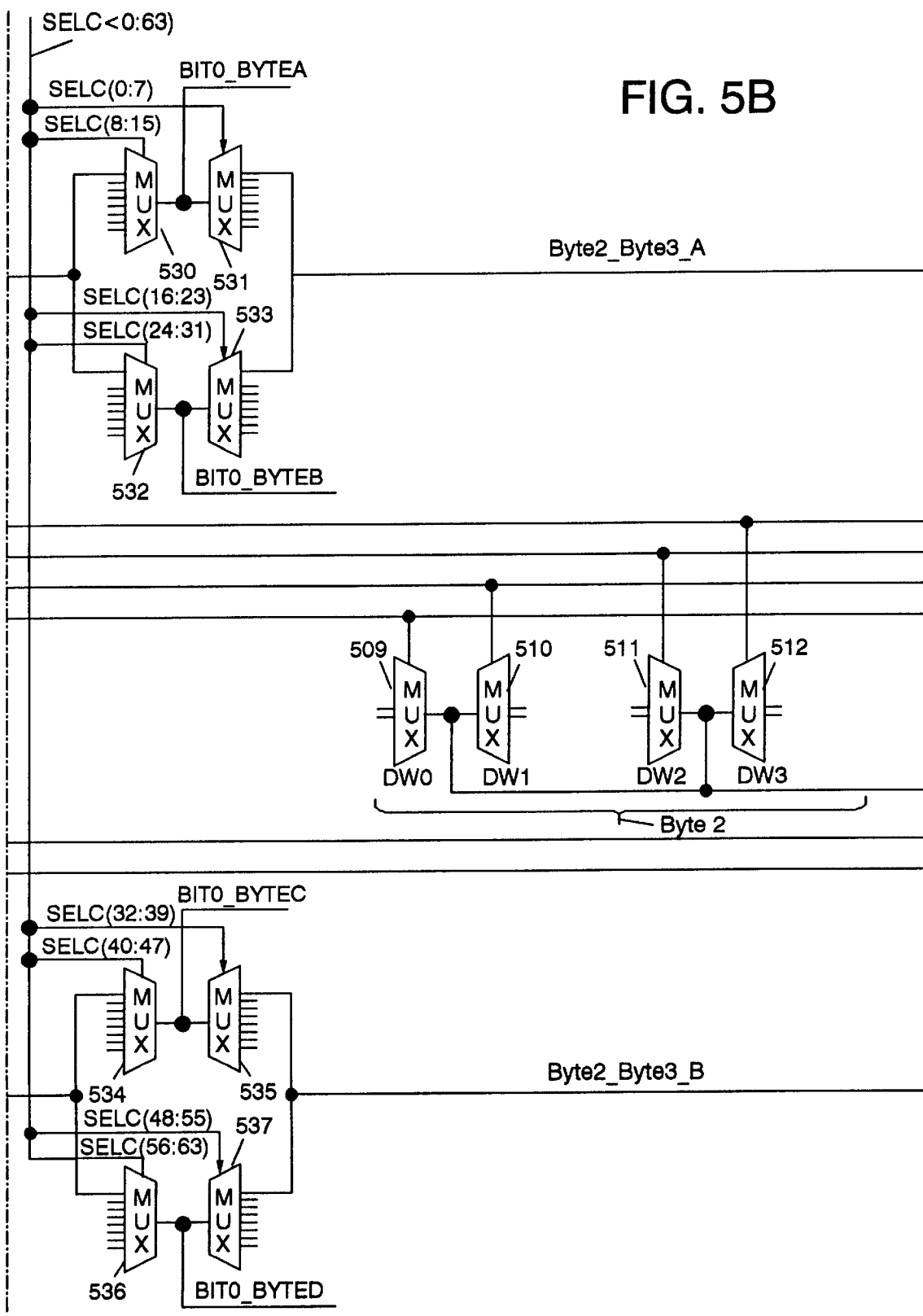
Figure 5C:
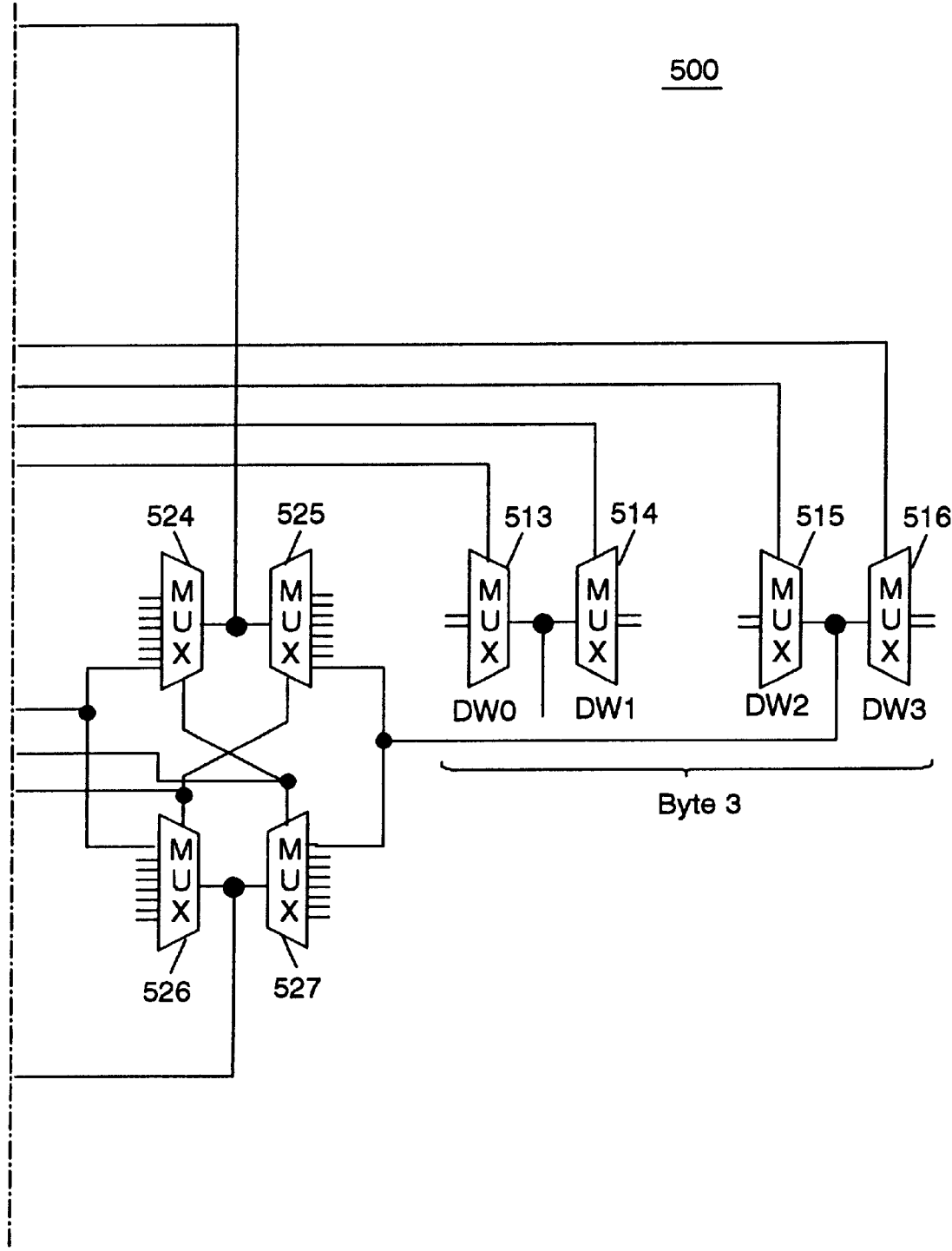

Portions of the generalized multiplexer tree 400 of FIG. 4B are shown in more detail in FIG. 5. The one-of-eight select signal SELA(0:7) chooses a bit (i.e., Bit 0) from an odd or even wordline from each one of four bytes (Byte 0–3) in a 64-bit doubleword using multiplexers (MUXes) 501–516. MUXes 501–516 initiate wordline selection and select a portion of the entire cache line. Next, the two-of-sixteen select signal SELB(0:15) causes the eight 8-input multiplexers 520–527 to select bits from eight of the 64 even or odd wordlines. The selected bit from Byte 0 is sent to MUXes 520 and 522. The selected bit from Byte 1 is sent to MUXes 521 and 523. The selected bit from Byte 2 is sent to MUXes 524 and 526. The selected bit from Byte 3 is sent to MUXes 525 and 527. With the second set of multiplexers, MUxes 520–527, additional row selection occurs and re-ordering of the data is begun.

The selected bits are then routed to either multiplexers 530–533 or multiplexers 534–537, which accomplish the final selection and routing according to the signal SELC (0:63). The number of active control signals in the set SELC(0:63) reflects the number of bytes to be read (between 1 and 8), thereby completing the selection of the bytes within a line.

Returning now to FIG. 4A, FIG. 4A depicts the logic gates used to generate the select controls, SELA, SELB and SELC, while summing two input operands. Logic gates 410–413, 420–425 and 430–432 generate controls for multiplexer tree 400 by summing address bits A(52:63) and B(52:63) and combining the sum with control signals, STEERING_INPUT, LE, STEERING, BYTE_IN_DW. The multiplexer selection controls are a combination of routing controls and data selection addresses. Addition is carried out by four 3-bit adder/decoders 410–411, which produce the decoded (1 of 8) form of the sum of the two 3-bit inputs. The design of adder/decoders 410–413 is adapted for the requirements of multiplexer tree 400. In other cache and multiplexer organizations, a different adder designed may be implemented.

The least significant bits of the two effective addresses, A(61:63) and B(61:63), are used by adder/decoder 413 to generate the correct value of the sum and a carry output (true and complement). For adder/decoders 410–412, the sum that each adder-decoder generates must be corrected for a carry from a lower-order group. The decoded form of the sum is corrected for a carry by circularly shifting each bit by one position. Adder/decoders 410, 411 and 412 calculate conditional carries for address bits A(52:60) and B(52:60), assuming an input carry of 1 and 0, and multiplexers 422 and 424 after the adder blocks select the correct carry out or sum with the actual carry from the lower 3-bit group.

Because of the propagation of the carry information through the adders 410–413 and multiplexers 420–423, the correct decoded sum for bits (58:63) is available before the correct decoded sums for the higher bits are available. Use of multiplexer tree 400 to propagate the data from the memory cell to bus 35 as the carry propagates through adders 410–413 allows partial overlapping of array access operations with address generation. The byte routing and selection information are ANDed with the decoded address to form the multiplexer select inputs.

Although the present invention and its advantages have been described in detail, it should be understood that various changes, substitutions and alterations can be made herein without departing from the spirit and scope of the invention as defined by the appended claims.

What is claimed is:

1. A memory circuit comprising:
   a plurality of memory locations for storing data;
   a first plurality of multiplexers coupled to said plurality of memory locations for selecting first selected ones of said data and outputting said first selected data on a first plurality of outputs of said first plurality of multiplexers;

a second plurality of multiplexers coupled to said first plurality of outputs of said first plurality of multiplexers for selecting ones of said first plurality of outputs, receiving from said selected ones of said first plurality of outputs second selected ones of said first selected data, and outputting said second selected data on a data bus coupled to said memory circuit; and control means for controlling said first plurality of multiplexers and said second plurality of multiplexers, wherein said control means causes said second plurality of multiplexers to select said selected ones of said first plurality of outputs at least partially in parallel with said selection of said first selected ones of said data by said first plurality of multiplexers, wherein said first selected data are stored in said memory locations from said data bus in a first order from a most significant bit to a least significant bit and said control means causes said second plurality of multiplexers to reorder said second selected data in a second order different from said first order prior to outputting said second selected data on said data bus, wherein said control means causes said second plurality of multiplexers to reorder said second selected data at least partially in parallel with said selection of said first selected ones of said data by said first plurality of multiplexers.

2. The memory circuit in claim 1 wherein said control means comprises an adder for adding a first address operand and a second address operand to produce an effective address of said first selected data.

3. The memory circuit in claim 2 wherein said adder produces a decoded effective address.

4. The memory circuit in claim 3 wherein said control means controls said first plurality of multiplexers using first selected least significant bits of said decoded effective address.

5. The memory circuit in claim 4 said control means controls said second plurality of multiplexers using second selected least significant bits of said decoded effective address, wherein said second selected least significant bits are more significant than said first selected least significant bits.

6. A memory circuit comprising:

a plurality of memory locations for storing data;

a first plurality of multilplexers coupled to said plurality of memory locations for selecting first selected ones of said data and outputting said first selected data on a first plurality of outputs of said first plurality of multiplexers;

a second plurality of multiplexers coupled to said first plurality of outputs of said first plurality of multiplexers for selecting ones of said first plurality of outputs, receiving from said selected ones of said first plurality of outputs second selected ones of said first selected data, and outputting said second selected data on a data bus coupled to said memory circuit, and control means for controlling said first plurality of multiplexers and said second plurality of multiplexers, wherein said control means causes said second plurality of multiplexers to select said selected ones of said first plurality of outputs at least partially in parallel with said selection of said first selected ones of said data by said first plurality of multiplexers, wherein said control means comprises an adder for adding a first address operand and a second address operand to produce an effective address of said first selected data, wherein said adder produces a decoded effective address, wherein said controls means controls said first plurality of multiplexers using first selected least significant bits of said decoded effective address, wherein said control means controls said second plurality of multiplexers using second selected least significant bits of said decoded effective address, wherein said second selected least significant bits are more significant than said first selected least significant bits, wherein said adder produces said first selected least significant bits prior to said second selected least significant bits.

7. A processing system comprising:

a processor;

a main memory coupled to said processor; and a cache memory associated with said processor, wherein said cache memory comprises:

a plurality of memory locations for storing data;

a first plurality of multiplexers coupled to said plurality of memory locations for selecting first selected ones of said data and outputting said first selected data on a first plurality of outputs of said first plurality of multiplexers;

a second plurality of multiplexers coupled to said first plurality of outputs of said first plurality of multiplexers for selecting ones of said first plurality of outputs, receiving from said selected ones of said first plurality of outputs second selected ones of said first selected data, and outputting said second selected data on a data bus coupled to said cache memory; and control means for controlling said first plurality of multiplexers and said second plurality of multiplexers, wherein said control means causes said second plurality of multiplexers to select said selected ones of said first plurality of outputs at least partially in parallel with said selection of said first selected ones of said data by said first plurality of multiplexers, wherein said first selected data are stored in said memory locations from said data bus in a first order from a most significant bit to a least significant bit and said control means causes said second plurality of multiplexers to reorder said second selected data in a second order different from said first order prior to outputting said second selected data on said data bus, wherein said control means causes said second plurality of multiplexers to reorder said second selected data at least partially and parallel with said selection of said first selected one of said data by said first plurality of multiplexers.

8. The processing system in claim 7 wherein said control means comprises an adder for adding a first address operand and a second address operand to produce an effective address of said first selected data.

9. The processing system in claim 8 wherein said adder produces a decoded effective address.

10. The processing system in claim 9 wherein said control means controls said first plurality of multiplexers using first selected least significant bits of said decoded effective address.

11. The processing system in claim 10 said control means controls said second plurality of multiplexers using second selected least significant bits of said decoded effective address, wherein said second selected least significant bits are more significant than said first selected least significant bits.

12. A processing system comprising:
a processor;
a main memory coupled to said processor; and
a cache memory associated with said processor, wherein said cache memory comprises:
   a plurality of memory locations for storing data;
   a first plurality of multiplexers coupled to said plurality of memory locations for selecting first selected ones of said data and outputting said first selected data on a first plurality of outputs of said first plurality of multiplexers;
   a second plurality of multiplexers coupled to said first plurality of outputs of said first plurality of multiplexers for selecting ones of said first plurality of outputs, receiving from said selected ones of said first plurality of outputs second selected ones of said first selected data, and outputting said second selected data on a data bus coupled to said cache memory; and
   control means for controlling said first plurality of multiplexers and said second plurality of multiplexers, wherein said control means causes said second plurality of multiplexers to select said selected ones of said first plurality of outputs at least partially in parallel with said selection of said first selected ones of said data by said first plurality of multiplexers, wherein said control means comprises an adder for adding a first address operand and a second address operand to produce an effective address of said first selected data, wherein said adder produces a decoded effective address, wherein said controls means controls said first plurality of multiplexers using first selected least significant bits of said decoded effective address, wherein said control means controls said second plurality of multiplexers using second selected least significant bits of said decoded effective address, wherein said second selected least significant bits are more significant than said first selected least significant bits, wherein said adder produces said first selected least significant bits prior to said second selected least significant bits.

13. A memory circuit comprising:
a plurality of memory locations for storing data;
a multiplexer tree coupled to said plurality of memory locations for accessing first selected ones of said data and outputting second selected ones of said first selected data on a data bus coupled to said memory circuit; and
control means for controlling said multiplexer tree, wherein said control means causes said multiplexer tree to select said second selected data at least partially in parallel with said selection of said first selected data,
wherein said first selected data are stored in said memory locations from said data bus in a first order from a most significant bit to a least significant bit and said control means causes said multiplexer tree to reorder said second selected data in a second order different from said first order prior to outputting said second selected data on said data bus,
wherein said control means causes said multiplexer tree to reorder said second selected data at least partially in parallel with said selection of said first selected data.

14. The memory circuit in claim 13 wherein said first selected data are stored in said memory locations from said data bus in a first order from a most significant bit to a least significant bit and said control means causes said multiplexer tree to reorder said second selected data in a second order different from said first order prior to outputting said second selected data on said data bus.

15. The memory circuit in claim 14 wherein said control means causes said multiplexer tree to reorder said second selected data at least partially in parallel with said selection of said first selected data.

16. A processing system comprising:
a processor;
a main memory coupled to said processor; and
a cache memory associated with said processor, wherein said cache memory comprises:
   a plurality of memory locations for storing data;
   a multiplexer tree coupled to said plurality of memory locations for accessing first selected ones of said data and outputting second selected ones of said first select ed data on a data bus coupled to said each memory; and
   control means for controlling said multiplexer tree, wherein said control means causes said multiplexer tree to select said second selected data at least partially in parallel with said selection of said first selected data, wherein said control means causes said multiplexer tree to reorder said second selected data at least partially in parallel with said selection of said first selected data.

* * * * *